Feb. 4, 1964     E. R. LE CLEAR     3,120,630
PULSE AMPLITUDE PERCENTAGE COMPARATOR SYSTEM
Filed June 30, 1960     2 Sheets-Sheet 1
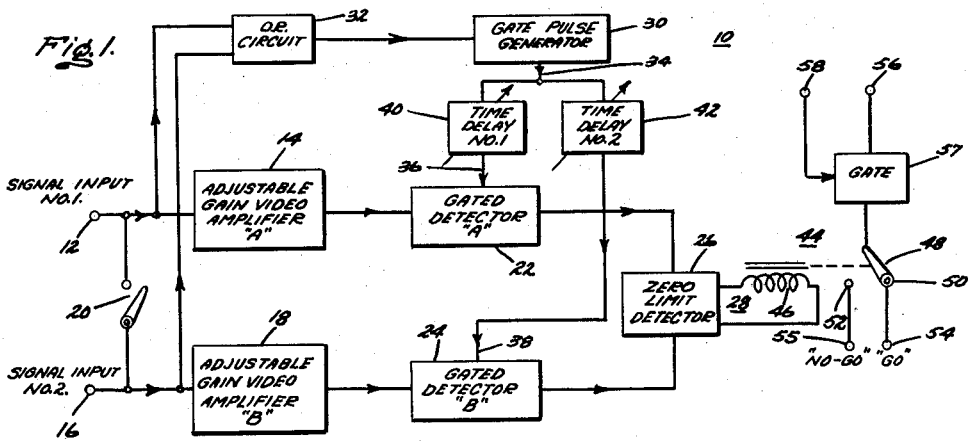
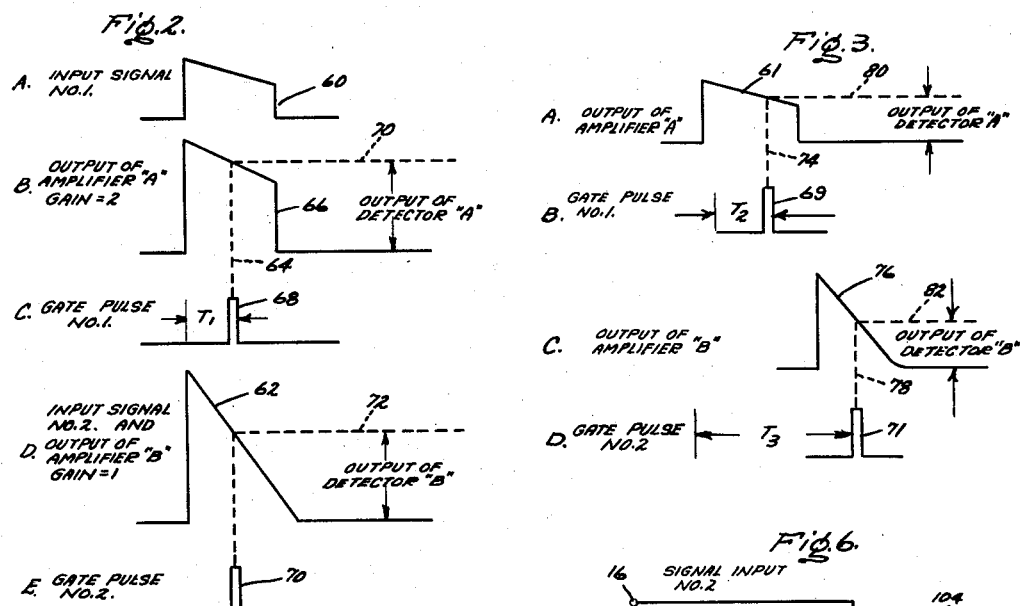
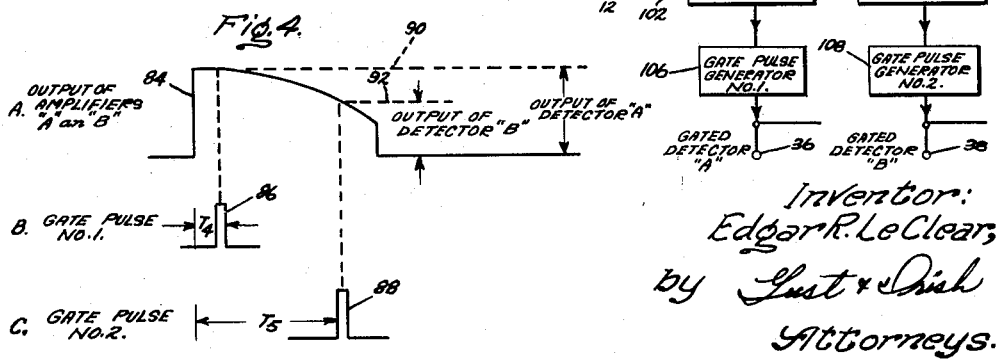
Inventor:
Edgar R. LeClear,
by Lust & Dish
Attorneys.

Feb. 4, 1964 E. R. LE CLEAR 3,120,630
PULSE AMPLITUDE PERCENTAGE COMPARATOR SYSTEM
Filed June 30, 1960 2 Sheets-Sheet 2
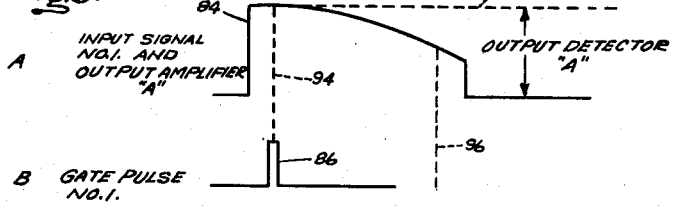
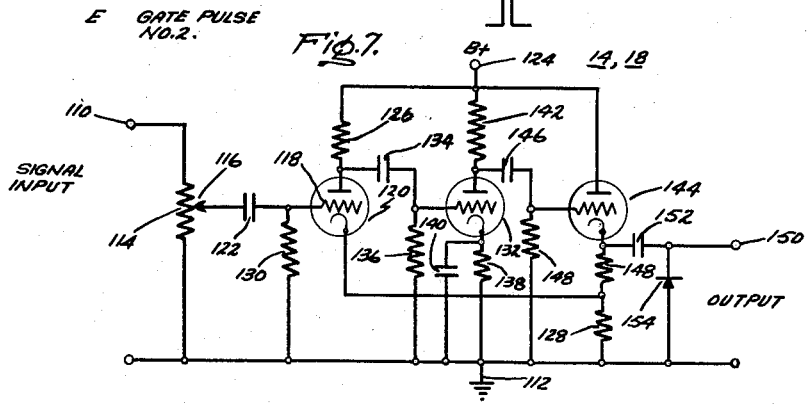
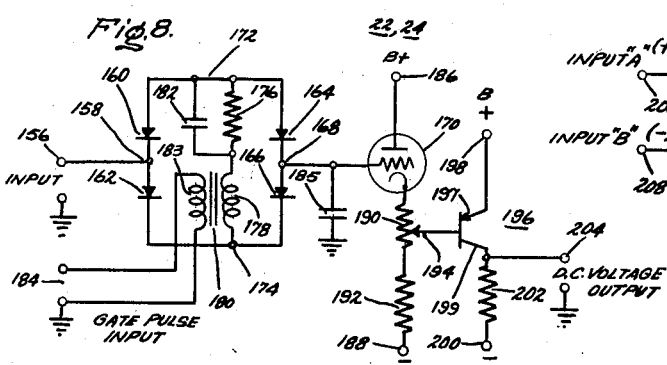
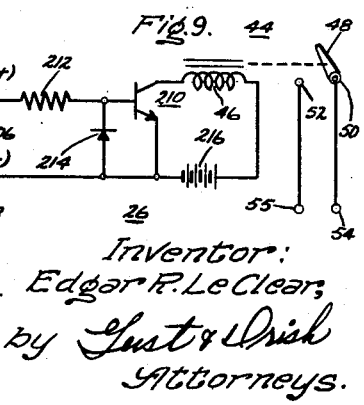
Inventor:
Edgar R. LeClear,
by Lust & Drish
Attorneys.

_United States Patent Office_ 3,120,630
Patented Feb. 4, 1964

3,120,630
PULSE AMPLITUDE PERCENTAGE
COMPARATOR SYSTEM
Edgar R. Le Clear, Fort Wayne, Ind., assignor to International Telephone and Telegraph Corporation
Filed June 30, 1960, Ser. No. 39,891
9 Claims. (Cl. 317—149)

This invention relates to a system for detecting and comparing the relative amplitudes of two pulses at the same or two given instants, or the relative amplitudes of a single pulse at two given instants.

In certain electronic systems in which pulses (which may be voltage, power, or radio frequency) are employed, it is sometimes desirable to compare the relative amplitudes of two separate pulses at a given instant, or to compare the amplitudes of two separate pulses, not necessarily occurring in time coincidence at two given instants, or to compare the relative amplitudes of a single pulse at any two given instants, all regardless of their absolute values. In the past, such comparisons have been rather laboriously made, generally by means of visual observation on an oscilloscope, and have thus been not only time consuming, but subject to considerable inaccuracy. It is accordingly desirable to provide a system for automatically making such pulse amplitude comparisons, and it is further desirable that such a system provide a "GO"—"NO GO" type of output indication.

It is therefore an object of my invention to provide a system for automatically detecting and comparing the relative amplitudes of two pulses at the same or two given instants or the relative amplitudes of a single pulse at two given instants.

My invention in its broader aspects provides first and second selectively adjustable gain amplifying means for respectively receiving the input pulses to be compared and for respectively providing output pulses having a selected gain. First and second detector means are provided for respectively receiving the output pulses and for respectively providing first and second direct current signals having levels respectively proportional to the amplitudes of the output pulses responsive respectively to first and second gating signals, and voltage comparator means are provided for comparing the direct current signals. In the preferred embodiment of my invention, the voltage comparator means is a differential amplifier which provides an output signal in response to a predetermined difference in the levels of the direct current signals impressed thereon. The gains of the first and second amplifying means are then relatively adjusted so that the direct current signals respectively provided by the detector means have the predetermined difference in level to provide the output signal when the amplitudes of the input pulses have the desired relationship.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a block diagram showing an embodiment of my invention;

FIGS. 2, 3, 4 and 5 show waveforms useful in explaining the mode of operation of my invention;

FIG. 6 is a fragmentary block diagram showing a modification of the embodiment of FIG. 1;

FIG. 7 is a diagram schematically showing one form of the adjustable gain video amplifiers employed in the embodiment of FIG. 1;

FIG. 8 is a diagram schematically showing one form of the gated detectors employed in the embodiment of FIG. 1; and FIG. 9 is a diagram schematically showing one form of the zero limit detector employed in the embodiment of FIG. 1.

Referring now to FIG. 1, the pulse amplitude comparator system of my invention, generally identified at 10, comprises a first signal pulse input terminal 12 coupled to a first adjustable gain video amplifier 14, identified as "A," and a second signal pulse input terminal 16 coupled to a second adjustable gain video amplifier 18, identified as "B." As will be hereinafter described, in certain instances, my system is employed for comparing the amplitudes of a single input pulse at two different predetermined instants and for this purpose, input terminals 12 and 16 are adapted to be selectively connected together by means of switch 20.

Amplifier 14 is coupled to a first gated detector 22, identified as "A" and amplifier 18 is coupled to a second gated detector 24, identified as "B." Gated detectors 22 and 24 are of the type which provide a direct current output signal having a level proportional to the amplitude of the input pulse applied thereto at the instant when a gating pulse is impressed thereon. Gated detectors 22 and 24 are respectively coupled to zero limit detector 26, which may be a differential amplifier arranged to provide an output signal in its output circuit 28 responsive to a predetermined difference in a given direction in the levels of the direct current signals provided by the gated detectors 22 and 24.

In order to provide the gating pulses for gating "on" the gated detectors 22 and 24 at the desired instants, I provide in the embodiment of FIG. 1, a gate pulse generator 30 arranged to provide a narrow pulse in response to a triggering pulse; gate pulse generator 30 may take any well known form, such as a monostable multivibrator or a blocking oscillator. The leading edge of the first input pulse to occur serves as the trigger for gate pulse generator 30, and thus, signal pulse input circuits 12 and 16 are coupled to a conventional OR circuit 32, which in turn is coupled to the gate pulse generator 30. Thus, the leading edge of the first input pulse to occur is impressed on the gate pulse generator 30 thereby to provide a narrow pulse. Output circuit 34 of gate pulse generator 30 is in turn coupled to the gate pulse input circuits 36 and 38 of gated detectors 22 and 24 by conventional time delay devices 40 and 42 which provide selectively adjustable time delays for the narrow pulse generated by gate pulse generator 30. Time delay devices 40 and 42 thus impress upon the gated detectors 22 and 24 narrow gating pulses at predetermined times.

A relay 44 is provided having its operating coil 46 coupled in output circuit 28 of zero limit detector 26 and energized responsive to the output signal therein. Relay 44 is provided with contacts 48 movable between first and second positions 50 and 52. A "GO" indication output circuit 54 is connected to contact position 50 and a "NO GO" output indication circuit 55 is connected to contact position 52. Contact 48 is in turn coupled to a suitable source of energizing potential 56 by gate 57. Gate 57 is energized thereby to connect contacts 48 to the source of potential 56 responsive to the occurrence of an external read signal applied to terminal 58.

Referring now to FIG. 2, it is here assumed that it is desired to determine whether the amplitude of pulse 60 impressed on the signal pulse input circuit 12 is half the amplitude of pulse 62 simultaneously impressed on signal pulse input circuit 16 at instant 64 occurring at half the duration of pulse 60. In this case, the gain of amplifier 14 is set to be twice that of amplifier 18 thereby impressing output pulse 66 upon gated detector 22. Thus, if at instant 64 the amplitude of input pulse 60 is in fact 50% of the amplitude of pulse 62, the amplitude of pulse 66 at this instant will be equal to the amplitude of pulse 62. Time delay devices 40 and 42 are thus adjusted to provide the same delay $T_1$ to the narrow pulse generated by gate pulse generator 30 in response to the leading edges of both pulses 60 and 62. Time delay device 40 will thus impress narrow gating pulse 68 upon gated detector 22 at instant 64 and time delay device 42 will likewise impress narrow gating pulse 70 coincident with gating pulse 68 upon gated detector 24. Gated detector 22 will thus provide an output signal having a direct current level as shown by dashed lines 70 in FIG. 2B and gated detector 24 will provide a direct current output signal having a level 72 as shown in FIG. 2D. If the amplitude of pulse 60 at instant 64 is in fact 50% of the amplitude of pulse 62, with zero limit detector 26 being a differential amplifier, and with output signals 70 and 72 impressed thereon from gated detectors 22 and 24, thus being at the same level, no output signal will be provided in output circuit 28 and thus operating coil 46 of relay 44 will not be energized.

In the particular mode of operation described in connection with FIG. 2, zero limit detector 26 is arranged to provide an output signal in its output circuit 28 thereby to energize operating coil 46 of relay 44 when the output signal level in gated detector 24 exceeds the output signal level from gated detector 22 by a predetermined amount. It will be readily comprehended that this differential necessary to provide sufficient current in output circuit 28 to energize operating coil 46 of relay 44 must be reflected in the relative gain of the amplifiers 14 and 18. Thus, the gains of the video amplifiers 14 and 18 are set so that $$u = \frac{g_1}{g_2}$$

where $u$ is defined as the fraction of the amplitude of a pulse impressed on input circuit 12 which a pulse impressed on input circuit 16 must exhibit to produce energization of operating coil 46 of relay 44, that is, the amplitude of the pulse impressed upon input circuit 16 must exceed $u$ times the amplitude of the pulse applied to input circuit 12.

Continuing with the mode of operation illustrated in FIG. 2, it will be seen that if the amplitude of pulse 60 at instant 64 had in fact been less than 50% that of pulse 62, output signal level 70 from gated detector 22 would have been less than output signal level 72 from gated detector 24, thereby providing an output signal in output circuit 28 of zero limit detector 26 and energizing operating coil 46 of relay 44 to pick up relay 44, thereby moving contacts 48 to position 52 to energize "NO GO" output indication circuit 55.

Referring now to FIG. 3, there is shown a mode of operation in which it is desired to compare the amplitude of pulse 61 impressed upon input circuit 12 at instant 74, with the amplitude of pulse 76 impressed upon input circuit 16 at instant 78. Thus, time delay device 40 is set to provide time delay $T_2$ for pulse 69 following the leading edge of pulse 61 and time delay device 42 is set to provide time delay $T_3$ for gating pulse 71 following the leading edge of pulse 61; here it is assumed that pulses 61 and 76 are intended to occur sequentially, as shown. The relative gains of amplifiers 14 and 18 are then set as described above, and thus, at instant 74, detector 22 will provide output signal level 80 and at instant 78 detector 22 will provide output signal level 82. As seen in FIG. 3, output signal level 80 is the same as output signal level 82, thus indicating that the amplitude of pulse 61 at instant 74 possessed the desired percentage relationship with respect to the amplitude of pulse 76 at instant 78. Again, if output signal level 80 had been less than output signal level 82, the output signal would have appeared in output circuit 28 and zero limit detector 26, thereby to energize operating coil 46 to move contacts 48 to "NO GO" position 52. It will be readily apparent that zero limit detector 26 may be polarized in the opposite direction, i.e., to provide current flow in output circuit 28 to energize operating coil 46 in response to the level of the output signal from gated detector 24 being higher than the level of the output signal from gated detector 22, rather than lower as has been described.

Referring now to FIG. 4, it may be desirable in certain instances to compare the amplitude of a single pulse at one point, for example adjacent its leading edge, to the amplitude at another point, for example adjacent the trailing edge. Referring now to FIG. 4, a single pulse 84 impressed on one of the signal input circuits 12 and 16 is impressed upon both of the amplifiers 14 and 18 by closing switch 20. Here, time delay device 40 is adjusted to provide delay $T_4$ for gating pulse 86 and time delay device 42 is adjusted to provide delay $T_5$ for gating pulse 88. Gating pulse 86 will thus actuate gated detector 22 to provide output signal level 90 while gating pulse 88 will actuate gated detector 24 to provide output level 92. It will be observed that the output level 92 is lower than output level 90 and thus current will flow in the output circuit 28 of zero limit detector 26 to energize operating coil 46 of relay 44 to move contacts 48 to the "NO GO" position. It will be readily apparent that pulse 84 triggers gate pulse generator 30 to provide the pulse which is impressed upon time delay devices 40 and 42.

In the case of the mode of operation explained above in connection with FIG. 4, it will be observed that the desired pulse 84 would have been substantially square, whereas the pulse actually decayed rapidly toward its trailing edge. In other instances, the desired pulse may have the configuration of pulse 84 of FIGS. 4 and 5, but it may therefore be desired to determine whether in fact the amplitude of pulse 84 at instant 94 adjacent its leading edge is twice the amplitude of the pulse at instant 96 adjacent its trailing edge. In this case, as shown in FIG. 5, amplifier 18 is set to have twice the gain of amplifier 14, as opposed to the condition shown in FIG. 4, in which the amplifiers would have the same gain, subjected to the conditions described above of a sufficient difference of gain to provide sufficient current to energize operating coil 46 of relay 44. Thus, input pulse 84 is applied to both amplifiers 14 and 18 and also to gated detector 22 whereas the pulse 98 applied to gated detector 24 has been amplified with a two-to-one gain, as shown in FIG. 5D. Gating signal 86 at instant 94 thus again provides an output signal having a level 90 from gated detector 22, whereas gating pulse 88 at instant 96 now provides an output signal from gated detector 24 having level 100. It will be observed that the levels of signals 90 and 100 are equal, and therefore, there will be no signal in the output circuit 28 of zero limit detector 26 and therefore relay 14 will not pick up.

The arrangement comprising gate pulse generator 30, time delay devices 40, 42 and OR circuit 32 shown in FIG. 1 contemplates input pulses which either occur in time coincidence, as shown in FIG. 2, or comparison of different amplitudes of a single pulse as shown in FIGS. 4 and 5, or input pulses having a definite time relation as shown in FIG. 3. It may, however, be desired to compare the amplitudes of pulses where the relative time relation is not fixed and the modified arrangement shown in FIG. 6 can be employed for this purpose. Here, signal pulse input circuit 12 is coupled to a monostable multivibrator 102 having a selectively adjustable time delay circuit for selectively determining the width of the pulse triggered by a respective input pulse. Signal input circuit 16 is likewise connected to monostable multivibrator 104 which also has a selectively adjustable time delay circuit for respectively determining the width of the pulse triggered by the input pulse on input circuit 16. Monostable multivibrator 102 in turn is coupled to gate pulse generator 106 which generates the gating pulse applied to gated detector 22 responsive to the trailing edge of the pulse generated by monostable multivibrator 102 and monostable multivibrator 104 is coupled to gate pulse generator 108 which generates the narrow gating pulse applied to gating detector 24 responsive to the trailing edge of the selectively variable width pulse generated by monostable multivibrator 104. It will thus be seen that in the arrangement of FIG. 6, the gating pulses applied to gating detectors 22 and 38 respectively bear a selectively adjustable time relation with respect to the leading edge of the respective input pulse, but do not necessarily bear a fixed time relation to each other, whereas, in the arrangement shown in FIG. 1, the two gating pulses are respectively provided by time delay devices 40 and 42 and thus bear a definite time relation to the original narrow pulse provided by gate pulse generator 30.

Referring now to FIG. 7, there is shown by way of example, an adjustable gain amplifier suitable for use as amplifier 14 or 18. Here, input terminal 110 is coupled to ground 112 by potentiometer 114 having its adjustable element 116 connected to grid 118 of tube 120 by coupling capacitor 122; adjustable element 116 of potentiometer 114 provides the selectively adjustable gain. The plate of tube 120 is connected to suitable source 124 of positive potential, such as +150 volts by plate resistor 126 and the cathode of tube 120 is connected to ground 112 by resistor 128. Grid 118 of tube 120 is connected to ground 112 by grid resistor 130. The plate of tube 120 is connected to the grid of tube 132 by coupling capacitor 134 and the grid of tube 132 is connected to ground by resistor 136. The cathode of tube 132 is connected to ground by resistor 138, having capacitor 140 connected in shunt thereacross. The plate of tube 132 is connected to source 124 by plate resistor 142. The plate of tube 132 is connected to the grid of tube 144 by coupling capacitor 146 and the grid is connected to ground by grid resistor 148. The plate of tube 144 is directly connected to source 124. The cathode of tube 144 is connected to ground by serially connected resistors 148 and 128 and to output terminal 150 by coupling capacitor 152. A clamping diode 154 connects output terminal 150 to ground as shown. It will be readily understood that other well known selectively adjustable gain amplifiers may be employed for amplifiers 14 and 18. It will further be readily understood that in instances when the pulses to be compared are radio frequency pulses, detectors will be necessary in order to provide video pulses for impression upon amplifiers 14 and 18.

Referring now to FIG. 8, there is shown by way of example, a gated detector circuit suitable for use for the gated detectors 22 and 24. Here, input terminal 156, which is coupled to the output circuit of the respective adjustable gain amplifier, is coupled to midpoint 158 between diodes 160 and 162. Diodes 164 and 166 are connected with diodes 160 and 162 in a full wave bridge rectifier circuit with midpoint 168 between diodes 164 and 166 being connected to the grid of tube 170. Midpoint 172 between diodes 160 and 164 and midpoint 174 between diodes 162 and 166 are serially connected by resistor 176 and winding 178 of transformer 180 with capacitor 182 being connected in shunt with resistor 176. Winding 183 of transformer 180 is connected to gate pulse input circuit 184. It will be observed that the series circuit consisting of resistor 176 and winding 178 is in the direct current path of the full wave rectifier, the impedance of which is varied by means of transformer 180. The grid of tube 170 is connected to ground by capacitor 185 and its plate is connected to source 186 of suitable positive plate potential, such as +150 volts. The cathode of tube 170 is connected to a suitable source 188 of negative potential, such as −26 volts by potentiometer 190 and resistor 192. The sliding element 194 of potentiometer 190 is connected to the base of transistor 196 having its emitter 197 connected to a suitable source 198 of positive potential, such as +26 volts and having its collector 199 connected to a suitable source 200 of negative potential, such as −26 volts by resistor 202. The collector 199 of transistor 196 is connected to direct current output voltage terminal 204. It will be seen that in the presence of the gating pulse applied to input circuit 184, a charge will be developed across capacitor 185 proportional to the amplitude of the pulse applied at input terminal 156. When the conduction of the bridge rectifier is terminated responsive to termination of the gating pulse, the charge on capacitor 185 is impressed upon the grid of tube 170 thus determining its conduction and in turn providing an essentially constant direct current output signal level at terminal 204 which is proportional to the amplitude of the pulse impressed on input circuit 156 at the instant of the gating pulse 184. It will be readily apparent that there are other gated detector circuits known to those skilled in the art which may be employed for gated detectors 22 and 24.

Referring to FIG. 9, there is shown by way of example a circuit for zero limit detector 26. Here, input terminals 206 and 208 are connected respectively to output circuits 204 of gated detectors 22 and 24. Input terminal 206 is connected to the base of transistor 210 by resistor 212 with the emitter of transistor 210 being connected to ground and to the other input terminal 208. Diode 214 is connected between the base of transistor 210 and ground. Operating coil 46 of relay 44 is serially connected between the collector of transistor 210 and a suitable source 216, such as +26 volts. It will be readily apparent that the base potential of transistor 210 is established by the voltage differential between terminals 206 and 208, i.e., the difference between the output signal levels provided by the gated detectors 22 and 24. It will be observed that the diode 214 is polarized to block the flow of current from terminal 206 to terminal 208. Thus, if the potential of terminal 206 rises above that of terminal 208 by the predetermined amount referred to above, transistor 210 will be turned on, thereby permitting current flow through coil 46 of relay 44. If, on the other hand, the potential of terminal 208 rises above that of terminal 206, diode 214 will conduct, thereby shunting transistor 210. It will be readily apparent that with the polarization of diode 214 reversed, and with transistor 210 being of the NPN type rather than the PNP type as shown, transistor 210 will conduct responsive to the potential of terminal 208 rising above that of terminal 206. It will further be readily apparent that other types of voltage comparators may be employed for providing an indication when the level of the output signal from one gated detector departs by a predetermined amount in a given direction from the level of the output signal of the other gated detector.

Typical values for the components of the circuits shown in FIGS. 7, 8 and 9 are as follows:

| | |
|---|---|
| Potentiometer 114 | 100 ohms. |
| Tube 120 | JAN 5840. |
| Capacitor 122 | 1000 micro-microfarads. |
| Resistor 126 | 1200 ohms. |
| Resistor 128 | 100 ohms. |
| Resistor 130 | 100,000 ohms. |
| Tube 132 | JAN 5718. |
| Capacitor 134 | 1000 micro-microfarads. |
| Resistor 136 | 150,000 ohms. |
| Resistor 138 | 27 ohms. |
| Capacitor 140 | 820 micro-microfarads. |
| Resistor 142 | 2200 ohms. |
| Tube 144 | JAN 6111. |
| Capacitor 146 | 1000 micro-microfarads. |
| Resistor 148 | 150,000 ohms. |
| Capacitor 152 | 0.01 microfarads. |
| Diode 154 | 1N659. |
| Diode 160 | 1N659. |
| Diode 162 | 1N659. |
| Diode 164 | 1N659. |
| Diode 166 | 1N659. |
| Tube 170 | JAN 5718. |
| Resistor 176 | 220,000 ohms. |
| Capacitor 182 | 0.022 microfarads. |
| Capacitor 185 | 1,000 micro-microfarads. |
| Potentiometer 190 | 2500 ohms. |

| Resistor 192 | 10,000 ohms. |
|---|---|
| Transistor 196 | 2N525. |
| Resistor 202 | 4700 ohms. |
| Transistor 210 | 2N335. |
| Resistor 212 | 10,000 ohms. |
| Diode 214 | 1N457. |

It will be readily apparent that I have provided an automatic pulse amplitude comparator system having sufficient flexibility to permit detection and comparison of the relative amplitudes of two pulses at the same or two given instants or the relative amplitudes of a single pulse at two given instants, regardless of their absolute values.

While I have described above the principles of my invention in connection with specific apparatus, it is to be clearly understood that this description is made only by way of example and not as a limitation to the scope of my invention.

What is claimed is:

1. A pulse amplitude percentage comparator system comprising: first and second selectively adjustable gain amplifying means for respectively receiving the pulses to be compared and for respectively providing output pulses having a selected gain; first and second gated detector means for respectively receiving said ouput pulses and including means for respectively actuating said detector means in response to first and second gating signals to provide first and second direct current signals having levels respectively proportional to the amplitudes of said output pulses; means for providing said gating signals at predetermined times; and voltage comparator means for comparing said direct current signals.

2. A pulse amplitude percentage comparator system comprising: first and second input circuits for respectively receiving input pulses to be compared; first and second pulse amplifiers respectively having means for selectively adjusting the gain thereof and respectively coupled to said input circuits for respectively providing output pulses having a selected gain; first and second gated detectors respectively coupled to said amplifiers and respectively having gating signal input circuits for respectively actuating said detectors to provide first and second direct current signals having levels respectively proportional to the amplitudes of said output pulses at the respective instants when gating signals are impressed thereon; means coupled to said gating signal input circuits for respectively providing gating signals at predetermined times; and voltage comparator means coupled to said detectors for comparing said direct current signals.

3. The combination of claim 2 wherein said voltage comparator means is a differential amplifier providing an output signal in response to predetermined difference in the levels of said direct current signals.

4. A pulse aamplitude percentage comparator system comprising: first and second input circuits for respectively receiving input pulses to be compared; first and second pulse amplifiers respectively having means for selectively adjusting the gain thereof and respectively coupled to said input circuits for respectively providing output pulses having a selected gain; first and second gated detectors respectively coupled to said amplifiers and respectively having gating signal input circuits for respectively actuating said detectors to provide first and second direct current signals having levels respectively proportional to the amplitudes of said ouput pulses at the respective instants when gating signals are impressed thereon; means coupled to said gating signal input circuits for respectively providing gating signals at predetermined times; a differential amplifier coupled to said detectors for providing an output signal in response to a predetermined difference in the levels of said direct current signals in a given direction; and relay means energized in response to said output signal; said relay means having contacts connected to a source of potential and movable between first and second output circuits in response to energization thereof.

5. A pulse amplitude comparator system comprising: first and second input circuits for respectively receiving input pulses to be compared; first and second pulse amplifiers respectively having means for selectively adjusting the gain thereof and respectively coupled to said input circuits for respectively providing output pulses having a selected gain; first and second gated detectors respectively coupled to said amplifiers and respectively having gating pulse input circuits for respectively actuating said detectors to provide first and second direct current signals having levels respectively proportional to the amplitudes of said output pulses at the respective instants when gating pulses are impressed thereon; gating pulse generator means coupled to said gating pulse input circuits for respectively impressing gating pulses thereon at predetermined times; and voltage comparator means coupled to said detectors for comparing said direct current signals.

6. The combination of claim 5 wherein said gating pulse generating means is coupled to said input circuits and triggered responsive to at least the first of the input pulses to occur, and wherein said gating pulse generating means includes means for respectively selectively adjusting the time of occurrence of said gating pulses with reference to the occurrence of said output pulses.

7. The combination of claim 5 wherein said gating pulse generating means is coupled to said input circuits and triggered responsive to the first of the input pulses to occur to provide a narrow pulse coincident with the leading edge of said first input pulse, and further comprising first and second selectively adjustable time delay means coupling said gating pulse generating means to said gating pulse input circuits for respectively providing first and second narrow gating pulses at predetermined times with reference to the leading edges of said output pulses.

8. The combination of claim 5 wherein said gating pulse generating means comprises first and second pulse generators coupled respectively to said input circuits and triggered responsive respectively to said input pulses, said pulse generators respectively including means for selectively determining the duration of the pulses provided thereby; and further comprising first and second means respectively coupling said pulse generators to said gating pulse input circuits to provide narrow gating pulses responsive respectively to the trailing edges of the pulses provided by said pulse generators.

9. The combination of claim 5 wherein said voltage comparator means is a differential amplifier for providing an output signal in response to a predetermined difference in the levels of said direct current signals in a given direction; and further comprising relay means energized in response to said output signal, said relay means having contacts movable between first and second output circuits in response to energization thereof, and gate means coupling said relay contacts to a source of potential in response to actuation thereof.

References Cited in the file of this patent

UNITED STATES PATENTS

| 2,684,443 | Tidball | July 20, 1954 |
|---|---|---|
| 2,736,878 | Boyle | Feb. 28, 1956 |
| 2,763,838 | McConnell | Sept. 18, 1956 |